(12) United States Patent
Xu

(10) Patent No.: US 12,259,612 B2
(45) Date of Patent: Mar. 25, 2025

(54) LIGHT CONTROL FILM AND DISPLAY PANEL

(71) Applicant: Shenzhen China Star Optoelectronics Semiconductor Display Technology Co., Ltd., Guangdong (CN)

(72) Inventor: Haotian Xu, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/413,249

(22) PCT Filed: May 31, 2021

(86) PCT No.: PCT/CN2021/097189
§ 371 (c)(1),
(2) Date: Jun. 11, 2021

(87) PCT Pub. No.: WO2022/241826
PCT Pub. Date: Nov. 24, 2022

(65) Prior Publication Data
US 2024/0248341 A1    Jul. 25, 2024

(30) Foreign Application Priority Data
May 17, 2021   (CN) .......................... 202110535099.5

(51) Int. Cl.
G02F 1/1334   (2006.01)
G02F 1/1335   (2006.01)

(52) U.S. Cl.
CPC ...... *G02F 1/1334* (2013.01); *G02F 1/133526* (2013.01)

(58) Field of Classification Search
CPC ............ G02F 1/1334; G02F 1/133526; G02F 1/133342
See application file for complete search history.

(56) References Cited

U.S. PATENT DOCUMENTS 9,740,018 B1 * 8/2017 Ouderkirk .............. G02B 5/003

FOREIGN PATENT DOCUMENTS

| CN | 203117442 U | 8/2012 |
| CN | 103605237 A | 2/2014 |
| CN | 108508509 A | 9/2018 |

(Continued)

*Primary Examiner* — Dung T Nguyen
*Assistant Examiner* — David Y Chung

(57) ABSTRACT

A light control film and a display panel are provided. Light blocking members of the light control film are disposed on a side of a first base material layer, and light transmissive regions are defined between the light blocking members. Light transmissive members are filled in the light transmissive regions. Light control members are disposed on the light transmissive members corresponding to the light transmissive regions and are configured to decrease light emission angles of light passing through the light transmissive members. Therefore, when a specific light emission angle is realized, an area of the light transmissive regions can be increased to remedy a problem that a low light transmittance rate exists in current anti-peep films.

18 Claims, 6 Drawing Sheets

(56) References Cited

FOREIGN PATENT DOCUMENTS

| | | |
|---|---|---|
| CN | 109445173 A | 3/2019 |
| CN | 110068946 A | 7/2019 |
| CN | 110764291 A | 2/2020 |
| CN | 112198702 A | 1/2021 |
| CN | 112631001 A | 4/2021 |
| WO | 2008047754 A1 | 4/2008 |
| WO | 2018225643 A1 | 12/2018 |

\* cited by examiner

LIGHT CONTROL FILM AND DISPLAY PANEL

BACKGROUND OF INVENTION

Field of Invention

The present application relates to the field of display technology and particularly to a light control film and a display panel.

Description of Prior Art

Anti-peep films are often used in display devices to realize anti-peep display. Visible regions of the anti-peep film are limited, so that when display devices using them perform display, a screen displayed by the display devices is only for a user to read from the front, while other people beside the user can only see a dark display screen, thereby effectively protecting the user's commercial secrets and/or personal privacy.

Generally, horizontal light blocking structures are arranged periodically on substrates in conventional anti-peep film structures, and privacy protection is realized by non-transparent light blocking structures blocking light at large angles. In order to obtain relatively smaller anti-peep viewing angles, distances between adjacent light blocking structures need to be made small, which can lead to a light transmittance rate of the anti-peep films being low, thereby affecting display effect of display devices.

Therefore, a technical problem that the low light transmittance rate exists in current anti-peep films needs to be solved.

SUMMARY OF INVENTION

The present application provides a light control film and a display panel to remedy the technical problem that the low light transmittance rate exists in current anti-peep films.

In order to solve the problems mentioned above, the present application provides the technical solutions as follows:

One embodiment of the present application provides a light control film, including:
a first base material layer;
light blocking members disposed on a side of the first base material layer, wherein light transmissive regions are defined between the light blocking members;
light transmissive members filled in the light transmissive regions; and
light control members disposed on the light transmissive members, corresponding to the light transmissive regions, and are configured to decrease light emission angles of light passing through the light transmissive members.

In the light control film provided by one embodiment of the present application, convex structures are disposed on a side of the light control members away from the first base material layer, and the convex structures form the light control members.

In the light control film provided by one embodiment of the present application, a longitudinal cross-sectional shape of the convex structures is arc, coordinate points Rx and Rz on the arc satisfy an equation: $Rx=R*\sin(\theta)$, $Rz=R*\cos(\theta)$, wherein R indicates a distance between an emission point of the light and the coordinate points, and $\theta$ indicates an emission angle of light in the light transmissive members.

In the light control film provided by one embodiment of the present application, grooved structures are defined on a side of the light transmissive members away from the first base material layer, and the light control members are disposed in the grooved structures.

In the light control film provided by one embodiment of the present application, a refractive index of the light control members is greater than a refractive index of the light transmissive members.

In the light control film provided by one embodiment of the present application, a longitudinal cross-sectional shape of the light control members is elliptical.

In the light control film provided by one embodiment of the present application, the light blocking member are disposed integrally, and openings are defined in the light blocking members to act as the light transmissive regions.

In the light control film provided by one embodiment of the present application, the light control film further includes:
a first electrode layer disposed between the first base material layer and the light blocking members;
a viewing-angle transformation layer disposed on a side of the light blocking members and the light control members away from the first electrode layer;
a second electrode layer disposed on a side of the viewing-angle transformation layer away from the light control members; and
a second base material layer disposed on a side of the second electrode layer away from the viewing-angle transformation layer;
wherein the viewing-angle transformation layer is configured to allow light passing through the viewing-angle transformation layer to not be refracted, when a voltage difference exists between the first electrode layer and the second electrode layer; or the viewing-angle transformation layer is configured to allow light passing through the viewing-angle transformation layer to be refracted, when the voltage difference does not exist between the first electrode layer and the second electrode layer.

In the light control film provided by one embodiment of the present application, the viewing-angle transformation layer includes a polymer and liquid crystal molecules dispersed in the polymer, and a refractive index of the polymer and a refractive index of the liquid crystal molecules are different.

In the light control film provided by one embodiment of the present application, the viewing-angle transformation layer includes a cylindrical lens and a liquid crystal layer sequentially disposed on a side of the second electrode layer away from the second base material layer, and a refractive index of the cylindrical lens and a refractive index of the liquid crystal layer are different.

One embodiment of the present application further includes a display panel, which includes a light control film. The light control film includes:
a first base material layer;
light blocking members disposed on a side of the first base material layer, wherein light transmissive regions are defined between the light blocking members;
light transmissive members filled in the light transmissive regions; and
light control members disposed on the light transmissive members, corresponding to the light transmissive regions, and are configured to decrease light emission angles of light passing through the light transmissive members.

In the display panel provided by one embodiment of the present application, convex structures are disposed on a side of the light control members away from the first base material layer, and the convex structures form the light control members.

In the display panel provided by one embodiment of the present application, a longitudinal cross-sectional shape of the convex structures is arc, coordinate points Rx and Rz on the arc satisfy an equation: $Rx=R*\sin(\theta)$, $Rz=R*\cos(\theta)$, wherein R indicates a distance between an emission point of the light and the coordinate points, and $\theta$ indicates an emission angle of light in the light transmissive members.

In the display panel provided by one embodiment of the present application, grooved structures are defined on a side of the light transmissive members away from the first base material layer, and the light control members are disposed in the grooved structures.

In the display panel provided by one embodiment of the present application, a refractive index of the light control members is greater than a refractive index of the light transmissive members.

In the display panel provided by one embodiment of the present application, a longitudinal cross-sectional shape of the light control members is elliptical.

In the display panel provided by one embodiment of the present application, the light blocking member are disposed integrally, and openings are defined in the light blocking members to act as the light transmissive regions.

In the display panel provided by one embodiment of the present application, the light control film further includes:
- a first electrode layer disposed between the first base material layer and the light blocking members;
- a viewing-angle transformation layer disposed on a side of the light blocking members and the light control members away from the first electrode layer;
- a second electrode layer disposed on a side of the viewing-angle transformation layer away from the light control members; and
- a second base material layer disposed on a side of the second electrode layer away from the viewing-angle transformation layer;
- wherein the viewing-angle transformation layer is configured to allow light passing through the viewing-angle transformation layer to not be refracted, when a voltage difference exists between the first electrode layer and the second electrode layer; or the viewing-angle transformation layer is configured to allow light passing through the viewing-angle transformation layer to be refracted, when the voltage difference does not exist between the first electrode layer and the second electrode layer.

In the display panel provided by one embodiment of the present application, the viewing-angle transformation layer includes a polymer and liquid crystal molecules dispersed in the polymer, and a refractive index of the polymer and a refractive index of the liquid crystal molecules are different.

In the display panel provided by one embodiment of the present application, the viewing-angle transformation layer includes a cylindrical lens and a liquid crystal layer sequentially disposed on a side of the second electrode layer away from the second base material layer, and a refractive index of the cylindrical lens and a refractive index of the liquid crystal layer are different.

In the light control film and the display panel provided by the present application, by disposing the light control members on the light transmissive members of the light transmissive regions, wherein the light control members are micro-lens structure, the micro-lens structures allow the light emission angles of the light passing through the light transmissive members to be reduced. Therefore, when certain light emission angles are realized, areas of the light transmissive regions are allowed to be enlarged, which improves a light transmittance rate of the light control film. Meanwhile, by disposing the viewing-angle transformation layer on the light control members, and by controlling the voltage difference between the first electrode layer and the second electrode layer, the viewing-angle transformation layer controls the light passing through the light transmissive members to realize switching between different viewing angles.

DESCRIPTION OF DRAWINGS

In order to more clearly illustrate embodiments or the technical solutions of the present application, the accompanying figures of the present application required for illustrating embodiments or the technical solutions of the present application will be described in brief. Obviously, the accompanying figures described below are only part of the embodiments of the present application, from which those skilled in the art can derive further figures without making any inventive efforts.

DETAILED DESCRIPTION OF EMBODIMENTS

Figure 1:
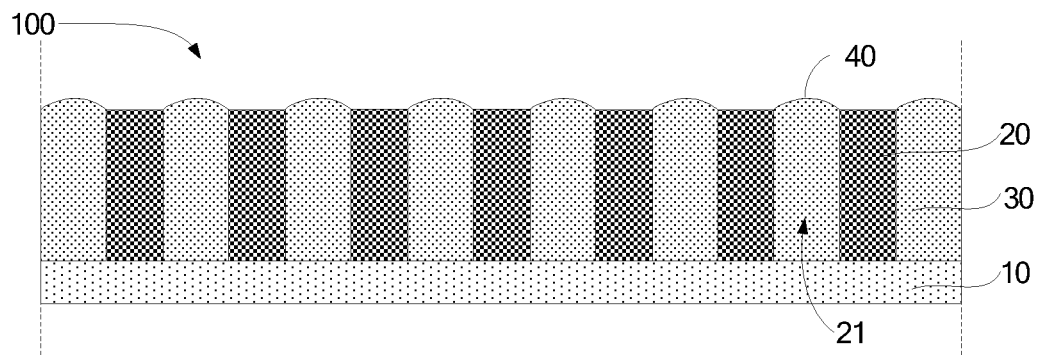
FIG. 1 is a schematic diagram of a first cross-sectional structure of a light control film provided by one embodiment of the present application.

The descriptions of embodiments below refer to accompanying drawings in order to illustrate certain embodiments which the present application can implement. The directional terms of which the present application mentions, for example, "top", "bottom", "upper", "lower", "front", "rear", "left", "right", "inside", "outside", "side", etc., only refer to directions of the accompanying figures. Therefore, the used directional terms are for illustrating and understanding the present application, but not for limiting the present application. In the figures, units with similar structures are indicated by the same reference numerals. In the drawings, the thicknesses of layers and regions are exaggerated for clarity. The dimensions and thickness of each component shown in the accompanying figures are arbitrarily shown, present application is not limited thereto.

Figure 2:
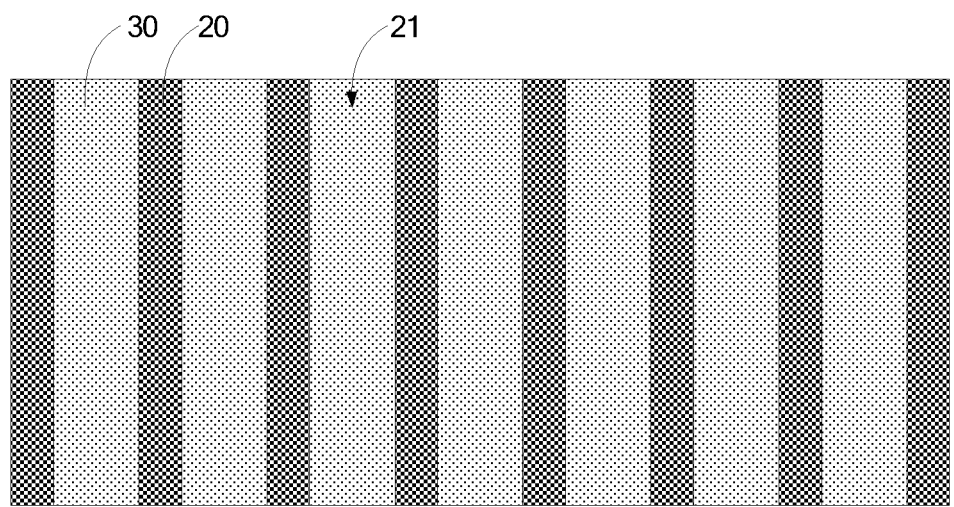
FIG. 2 is a top-view structural schematic diagram of the light control film provided by one embodiment of the present application.

Please combine and refer to FIG. 1 and FIG. 2. FIG. 1 is a schematic diagram of a first cross-sectional structure of a light control film provided by one embodiment of the present application. FIG. 2 is a top-view structural schematic diagram of the light control film provided by one embodiment of the present application. The light control film 100 is applied in a display device to realize an anti-peep function of the display device. The light control film 100 includes a first base material layer 10, light blocking members 20, light transmissive members 30, and light control members 40. The light blocking members 20 are disposed on a side of the first base material layer, and light transmissive regions 21 are defined between the light blocking members 20. The light transmissive members 30 are filled in the light transmissive regions 21. The light control members 40 are disposed on the light transmissive members 30, correspond to the light transmissive regions 21, and are configured to decrease light emission angles of light passing through the light transmissive members 30.

Specifically, a material of the first base material layer 10 is a transparent material. Generally, light transmissive glass or light transmissive resin materials, for example, a transparent resin material such as polyethylene terephthalate (PET) or polycarbonate (PC), etc., is allowed to be applied.

The light blocking members 20 are disposed on one side of the first base material layer 10 and are configured to block and to absorb light. Optionally, the light blocking members 20 are arranged in an array manner along a horizontal direction on the first substrate layer 10 in strip shapes. Each of the strip-shaped light blocking members 20 are parallel to each other. Furthermore, there are intervals between the light blocking members 20, and the intervals can be light transmissive to act as light transmissive regions 21. In this way, the light blocking members 20 arranged in the array manner along the horizontal direction can block the light from scattering in the horizontal direction, so as to realize the anti-peep function in the horizontal direction. Wherein, a material of the light blocking members 20 includes a material having light shielding function, such as black acroleic acid resin, etc.

The light transmissive members 30 are disposed in the light transmissive regions 21 between the light transmissive members 20 to maintain stability between the light blocking members 20. For example, separation distances between the light blocking members 20 can be maintained to ensure the light transmissive regions 21 to be effective in allowing the light to pass through. A material of the light transmissive members 30 can be determined according to specific fabrication processes. For example, when laser is used for material-reduction processes, the material of the light transmissive members 30 can be same as the material of the first base material layer 10. When photolithography is used for fabrication, the material of the light transmissive members 30 can be a photosensitive material, etc.

Convex structures are disposed on a side of the light transmissive members 30 away from the first base material layer 10, and the convex structures form the light control members 40, i.e., the convex structures on the light transmissive members 30 of this embodiment act as the light control members 40 to decrease light emission angles of light passing through the light transmissive members 30. A longitudinal cross-sectional shape of the convex structures is arc, which allows the convex structures to be equivalent to a convex micro lens, which can serve a function of converging light.

The following will specifically explain how to obtain the arc of the convex structures.

Figure 3:
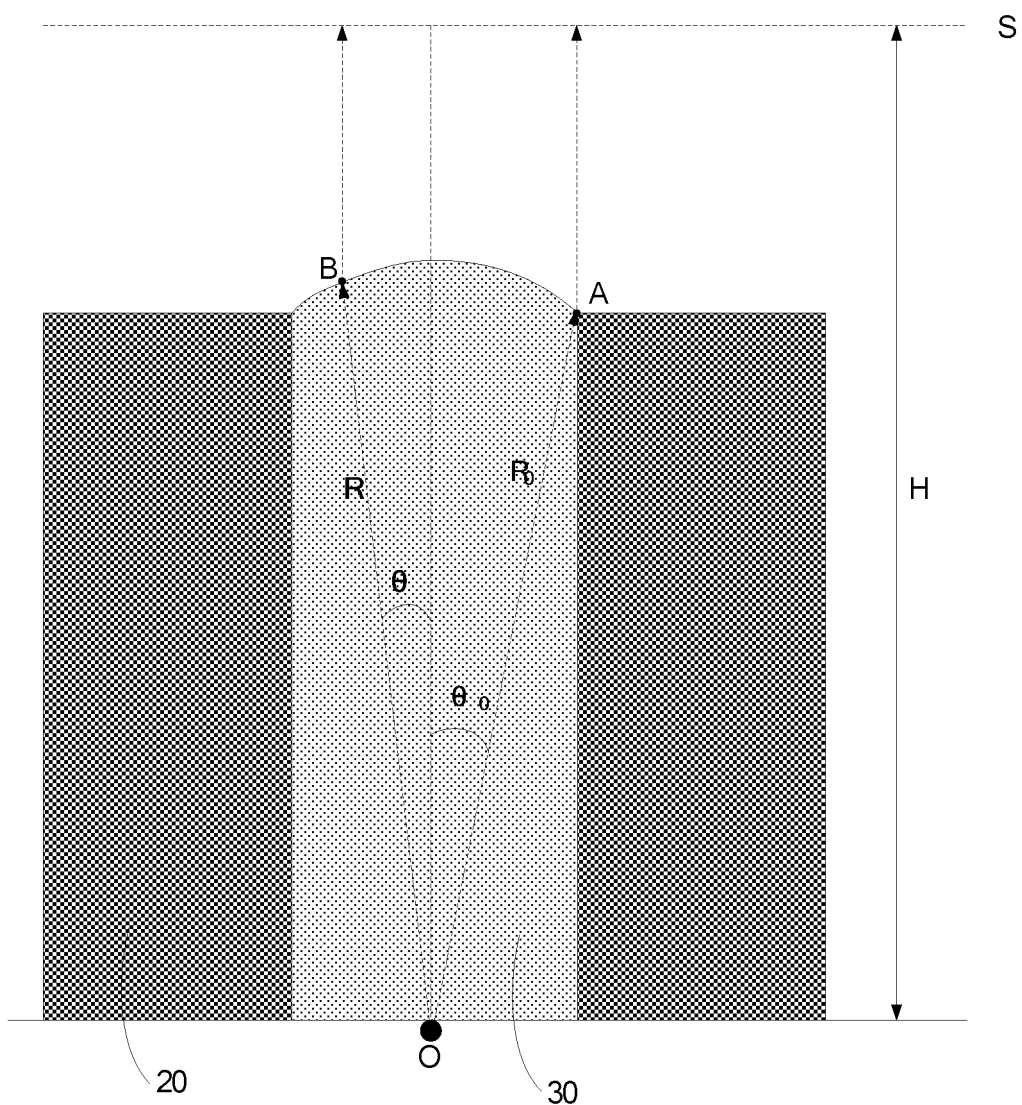
FIG. 3 is a schematic diagram of transmission of light in the light control film provided by one embodiment of the present application.

Please refer to FIG. 3. FIG. 3 is a schematic diagram of transmission of light in the light control film provided by one embodiment of the present application. Any coordinate point B (Rx, Rz) on the arc of the convex structures satisfies an equation: $Rx=R*\sin(\theta)$, $Rz=R*\cos(\theta)$, wherein R indicates a distance between an emission point O of the light and the coordinate point B, and $\theta$ indicates an emission angle of light in the light transmissive members 30. By the equation, coordinate values of the plurality of coordinate points can be calculated, and the arc of the convex structures can be obtained on the basis of the calculated coordinate points.

In FIG. 3, a light source is approximated as a point light source located in a middle of the adjacent light blocking members 20, a light A emitted from the emission point O of the light source is already known, and an optical path of the known light A is:

$\Phi 0 = n1*R0 + n2(H - R0*\cos(\theta 0))$. Wherein, n1 is a refractive index of the light transmissive members 30, R0 is a distance from the light source emission point O to a boundary interface of the convex structures and a light-emission medium, H is a distance from the light source emission point O to a wavefront surface S, $\theta 0$ is an emission angle of the known light, and n2 is a refractive index of the light-emission medium. In this embodiment, the light-emission medium is air, and a refractive index value of air is 1. It should be noted that the wavefront surface S refers to a virtual plane parallel to the first base material layer 10, and the light emitted from the point light source after passing through the light control members 40 is perpendicular to the virtual plane.

Similarly, the optical path of light passing through any coordinate point B on the arc of the convex structure is:

$\Phi = n1*R + n2(H - R*\cos(\theta))$. All incident lights of the required light source are emitted collimately. According to equal optical path property of lens: $\Phi 0 = \Phi$, and after rearranging, obtains:

$$R = (n1*R0 - n2*\cos\theta 0 R0)/(n1 - n2*\cos\theta).$$

Then, according to a trigonometric function, any coordinate point B on the arc of the convex structure can be obtained, which is: $(Rx, Rz): Rx=R*\sin(\theta) \cdot Rz=R*\cos(\theta)$. By discretization of the light emission angle $\theta$, a series of discrete coordinate points on the arc of the convex structure can be obtained, and these discrete coordinate points can be interpolated or fitted to obtain the arc of the convex structure.

Furthermore, the convex structures on the light transmissive members 30 are used as the light transmissive members 40, and no other film layer is disposed on the light control members 40. After the light passes through the light control members 40, and the light-emission medium is air, the refractive index of air is less than the refractive index of the light control members 40. Furthermore, it can be understood that the refractive index of air is the smallest compared to refractive indices of general film materials, so a refractive index difference of air is the largest compared to the general film material and the light control member 40, so relatively small protruding height can be configured on the convex structure.

In this embodiment, by disposing the light control members 40, the light emission angles of the light transmissive members 30 are allowed to be reduced. Therefore, compared to a situation that where no light control member 40 is disposed, and when a width and a height of the light blocking members 20 are same, in order to realize a specific light emission angle, the embodiments of the present application can increase intervals between the light blocking members 20, i.e., areas of the light transmissive regions 21 are allowed to be increased, thereby increasing the light transmittance rate of the light control film.

The following simulates beneficial effects that the light control film of the embodiments of the application can realize.

Figure 4:
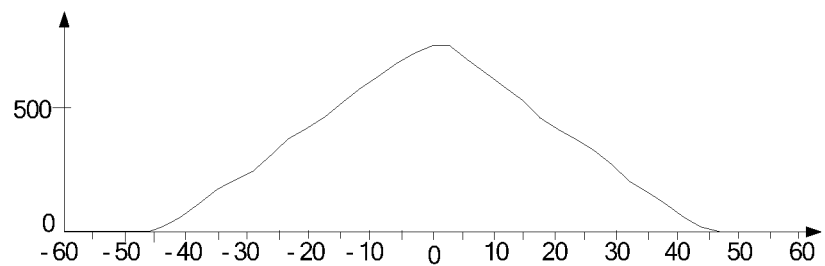
FIG. 4 is an angular luminance distribution diagram of a traditional anti-peep film structure.
Figure 5:
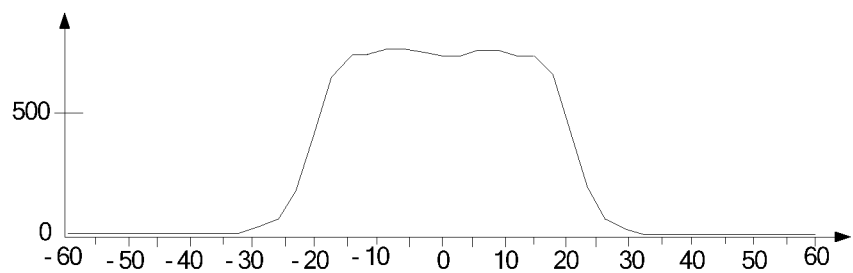
FIG. 5 is an angular luminance distribution diagram of the light control film provided by one embodiment of the present application.

Please combine and refer to FIG. 4 and FIG. 5. FIG. 4 is an angular luminance distribution diagram of a traditional anti-peep film structure. FIG. 5 is an angular luminance distribution diagram of the light control film provided by one embodiment of the present application. Angular luminance refers to brightness corresponding to light emission angles. As illustrated in FIG. 4 and FIG. 5, an abscissa indicates the different light emission angles, and an ordinate indicates the brightness corresponding to light emission angles. The data shown in FIG. 4 and FIG. 5 are obtained through measurement under a situation that other parameter values except a parameter value of the light control member 40 are configured to be same. The other parameter values include the height and the width of the light blocking members 20 and the intervals between the light blocking members 20, etc.

In FIG. 4, it can be understood that the light emission angles of the traditional anti-peep film structure are within the range of ±45°. The range of ±45° of the light emission angle is also a visible range of the traditional anti-peep film, and light intensity within this visible range decays rapidly with change of the light emission angles. In FIG. 5, it can be understood that the light emission angles of the light control film of the embodiments of the present application are within the range of ±30°. The ±30° light emission angle is also the visible range of the light control film, and a change trend of light intensity within this visible range within this visible range is relative smooth.

Therefore, from the angular luminance distribution diagrams of FIG. 4 and FIG. 5, it can be significantly understood that the light emission angles of the light are narrowed from 45° to 30° due to disposing the light control members 40 in the light control film of the embodiments of the present application. Therefore, in order to realize specific light emission angles, compared the light control film of the embodiments of the present application to the traditional anti-peep film, the intervals between the light blocking members 20 can be configured larger to enlarge the areas of the light transmissive regions 21, thereby improving light transmissive property of the light control film.

Furthermore, from the angular luminance distribution diagrams of FIG. 4 and FIG. 5, it can be further understood that the angular luminance distribution of the light control film of the embodiments of the present application is relatively smooth, thereby improving uniformity of distribution of the light brightness. Specifically, relative standard deviation (RSD) can be used to evaluate the brightness of the emitted light within the range of ±30° to characterize non-uniformity of angular luminance thereof. The relative standard deviation can be expressed in the following form:

$$RSD = \sqrt{\frac{1}{N-1}\Sigma_{i=1}^{N}\left(\frac{L_i - \overline{L}}{\overline{L}}\right)^2}.$$

Wherein, N represents a number of sampling points. The sampling point refers to measurement of brightness of the emitted light at a specific light angle by using a detection instrument. The greater the number of samples there are, the higher the measurement accuracy is. For example, if the light emission angle is within a range of 0°-89°, and the detection instrument measures once every 1°, then a number of samples is 90; if the detection instrument measures once every 2°, the number of the samples is 45. Li represents a brightness value of the sampling point at the i-th row, $\overline{L}$ represents an average brightness of a sampling light in a sampling region, in which value can be obtained from the following formula:

$$\overline{L} = \frac{\Sigma_{i=1}^{N} L(i)}{N},$$

while uniformity of the light brightness can be defined as (1−RSD)*100%, which can be calculated from the aforesaid formula. The light control film of the embodiments of the present application allows the uniformity of the light brightness to be improved from 39% to 65%.

In this embodiment, by disposing the convex structures on the light transmissive members 30 to act as the light control members 40, the light emission angle of light passing through the light transmissive members 30 is allowed to be decreased. Therefore, when certain light emission angles are realized, areas of the light transmissive regions 21 are allowed to be enlarged, which improves the light transmittance rate of the light control film 100 while also allowing the uniformity of brightness distribution of the light in the visible range to be improved.

Figure 6:
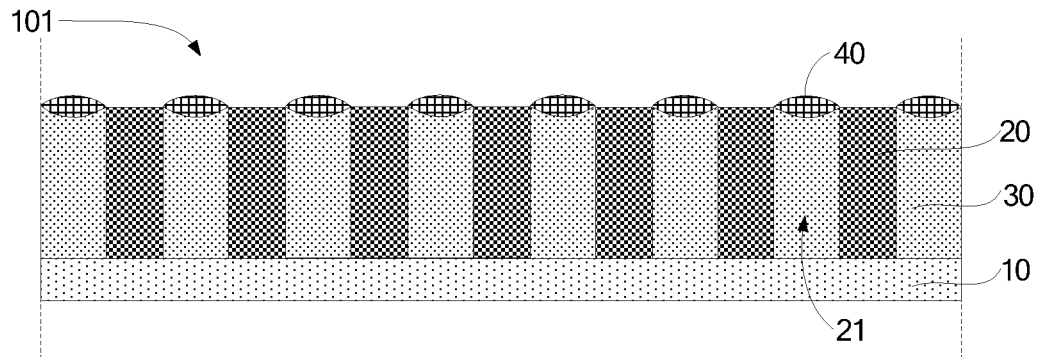
FIG. 6 is a schematic diagram of a second cross-sectional structure of the light control film provided by one embodiment of the present application.

In one embodiment, please refer to FIG. 6. FIG. 6 is a schematic diagram of a second cross-sectional structure of the light control film provided by one embodiment of the present application. The difference from the aforesaid embodiment is that grooved structures are defined on a side of the light transmissive members 30 of the light control film 101 away from the first base material layer 10, and the light control members 40 are disposed in the grooved structures.

Specifically, a longitudinal cross-sectional shape of the grooved structures is arc. The light transmissive members 40 are disposed in the grooves. A surface of the light control members 40 in contact with the light transmissive members 30 is also arc. Meanwhile, a height of the light control members 40 is further higher than an upper surface of the light blocking members 20, and surfaces of the light control members 40 and an interface of the emission medium is also arc. Therefore, an overall longitudinal cross-sectional shape of the light control members 40 is elliptical, which allows the light control member 40 to be a micro convex lens. Wherein, the upper surface of the light blocking members 20 refers to a side of the light blocking members 20 away from the first base material layer 10.

Furthermore, a refractive index of the light control members 40 is greater than a refractive index of the light transmissive members 30. A material that can be cured by ultraviolet light, etc., can be selected as a material of the light control member 40.

Because the light control members 40 including two arc surfaces are disposed in the light control film 101 of this embodiment, a reduction of the light emission angles of the light passing through the light transmission members 30 can also be realized. Therefore, when the specific light emission angle is realized, the areas of the light transmissive regions 21 are allowed to be increased, which improves the light transmittance rate of the light control film 101 and improves the uniformity of the distribution the light brightness in the visible range. Meanwhile, compared to the light control members 40 adopting one arc surface, the light control members 40 adopting two arc surfaces can reduce a curvature of the arc surfaces of the light control members 40 and can reduce the height of convex parts of the light control members 40 to enhance light control effect. For other descriptions, please refer to the embodiments mentioned above, and redundant description will not be mentioned herein again.

Figure 7:
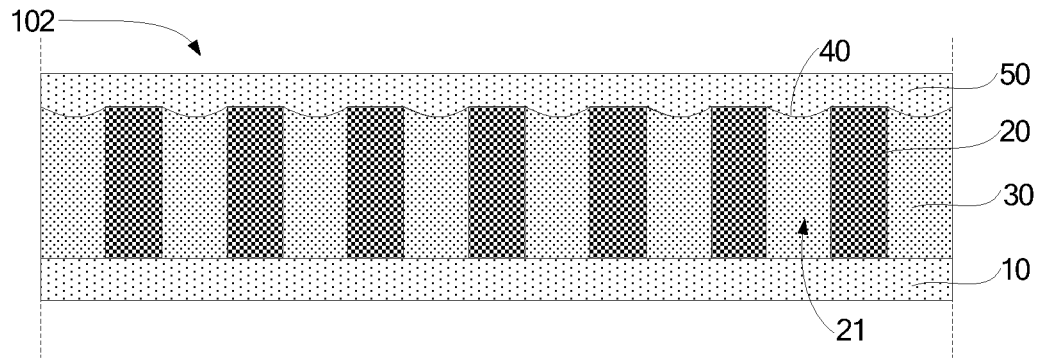
FIG. 7 is a schematic diagram of a third cross-sectional structure of the light control film provided by one embodiment of the present application.

In one embodiment, please refer to FIG. 7. FIG. 7 is a schematic diagram of a third cross-sectional structure of the light control film provided by one embodiment of the present application. The difference from the aforesaid embodiments is that the groove structures are disposed in the light transmissive members 30 of the light control film 102, and the light control film 102 further includes a protective layer 50, wherein the protective layer 50 is disposed on the upper surface of the light blocking members 20 and in the groove structures.

Specifically, a longitudinal cross-sectional shape of the grooved structures is arc, a part of the protective layer 50 filled in the groove structures forms convex micro lenses to serve as the light control members 40, and a refractive index of a transparent material adopted in the protective layer 50 is greater than a refractive index of a transparent material of the light transmissive members 30. Therefore, the light emission angles of the light passing through the light transmissive members 30 can still be reduced to realize the purpose of improving the light transmittance rate of the light control film 102. For other descriptions, please refer to the embodiments mentioned above, and redundant description will not be mentioned herein again.

Figure 8:
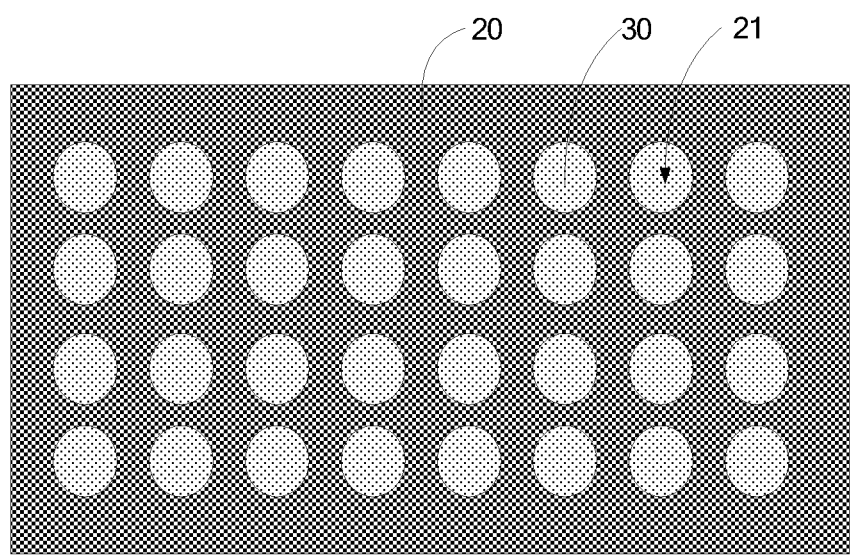
FIG. 8 is another top-view structural schematic diagram of the light control film provided by one embodiment of the present application.
Figure 9:
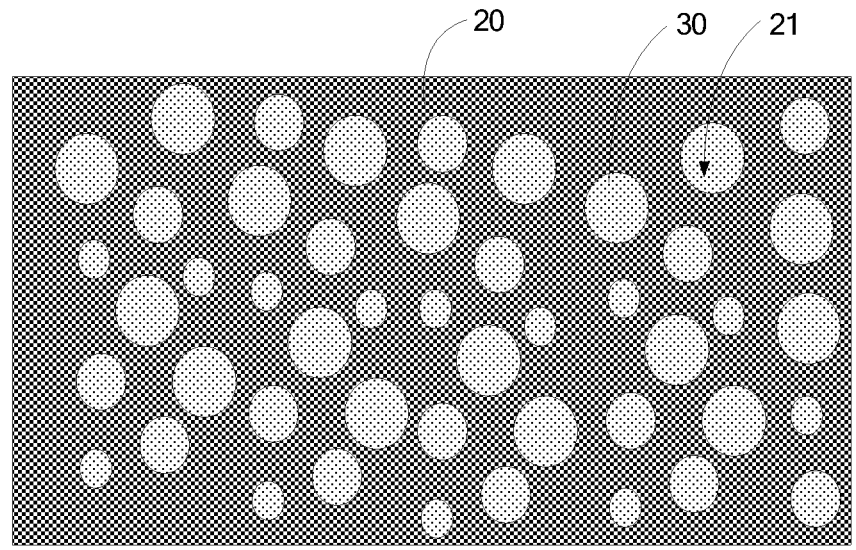
FIG. 9 is a yet another top-view structural schematic diagram of the light control film provided by one embodiment of the present application.

In one embodiment, please refer to FIG. 8 and FIG. 9. FIG. 8 is another top-view structural schematic diagram of the light control film provided by one embodiment of the present application. FIG. 9 is a yet another top-view structural schematic diagram of the light control film provided by one embodiment of the present application. The difference from the aforesaid embodiments is that the light blocking members 20 of the light control film are disposed integrally, openings are defined in the light blocking members 20 to act as the light transmissive regions 21, and the light transmissive members 30 are filled in the light transmissive regions 21. Therefore, all-round anti-peep is allowed to be realized. As illustrated in FIG. 8, the openings can be arranged regularly, or as illustrated in FIG. 9, they can be randomly arranged. For other descriptions, please refer to the embodiments mentioned above, and redundant description will not be mentioned herein again.

Figure 10:
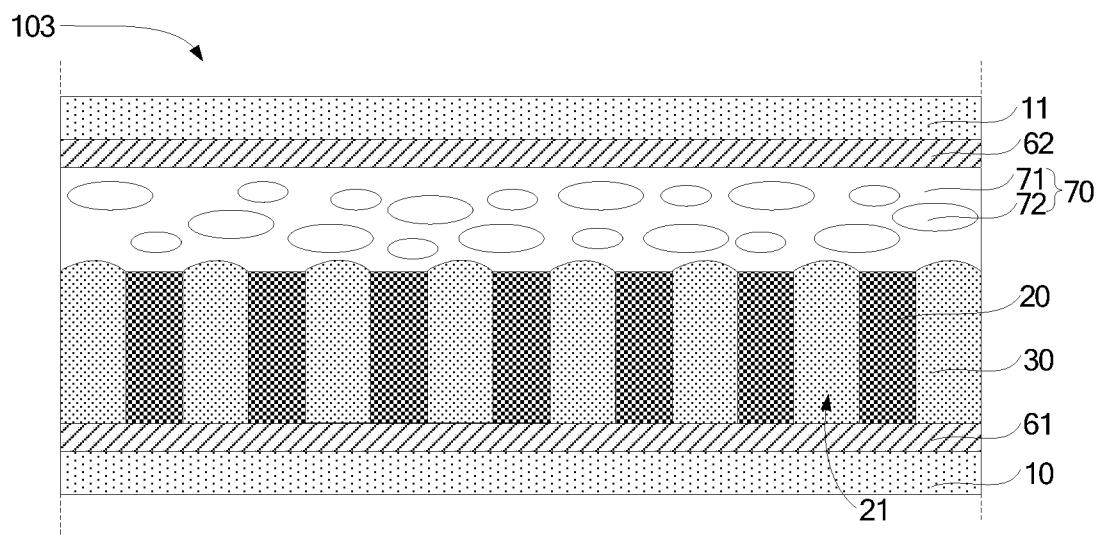
FIG. 10 is a schematic diagram of a fourth cross-sectional structure of the light control film provided by one embodiment of the present application.

In one embodiment, please refer to FIG. 10. FIG. 10 is a schematic diagram of a fourth cross-sectional structure of the light control film provided by one embodiment of the present application. The difference from the aforesaid embodiments is that the light control film 103 further includes a first electrode layer 61, a viewing-angle transformation layer 70, a second electrode layer 62, and a second base material layer 11, and the first electrode layer 61 is disposed between the first base material layer 10 and the light blocking members 20. The viewing-angle transformation layer 70 is disposed on a side of the light blocking members 20 and the light control members 40 away from the first electrode layer 61. The second electrode layer 62 is disposed on a side of the viewing-angle transformation layer 70 away from the light control members 40. The second base material layer 11 is disposed on a side of the second electrode layer 62 away from the viewing-angle transformation layer 70. Wherein, the viewing-angle transformation layer 70 is configured to allow light passing through the viewing-angle transformation layer 70 to not be refracted, when a voltage difference exists between the first electrode layer 61 and the second electrode layer 62; or the viewing-angle transformation layer is configured to allow light passing through the viewing-angle transformation layer 70 to be refracted, when the voltage difference does not exist between the first electrode layer 61 and the second electrode layer 62.

Optionally, a transparent electrically conductive electrode material, such as indium tin oxide (ITO), etc., is adopted in the first electrode layer 61 and the second electrode layer 62 to improve the light transmittance rate.

Optionally, the viewing-angle transformation layer 70 includes a polymer 71 and liquid crystal molecules 72 dispersed in the polymer 71, and a refractive index of the polymer 71 and a refractive index of the liquid crystal molecules 72 are different. Specifically, in order to allow the liquid crystal molecules 72 to be dispersed in the polymer 71 in a form of small droplets to realize the required viewing-angle transformation layer 70, a method such as a polymerization induced phase separation method, a thermal induced phase separation method, a phase separation by solvent evaporation method, a liquid crystal in templated cavity method, a nematic curved align phase method, etc., can be adopted. For example, when the polymerization induced phase separation method is adopted, the polymer 71 can be epoxy resin, acrylate, methylbiphenyl diacrylate, biphenyl vinyl acetate, etc.; when thermal induced phase separation method is adopted, mixture of mercaptan and liquid crystals can be used, and after phase separation occurs, ultraviolet is used to cure the mercaptan to form the polymer 71; and when the nematic curved align phase method is used, the polymer 71 can be obtained by drying in aqueous solution of polyvinyl alcohol. A material of the liquid crystal molecules 72 can be cholesteric liquid crystals or nematic phase liquid crystals, etc.

Furthermore, the liquid crystal molecules 72 can be deflected under an electric field provided by the first electrode layer 61 and the second electrode layer 62, thereby changing the refractive index. When there is no voltage between the first electrode layer 61 and the second electrode layer 62, the refractive index of the liquid crystal molecules 72 is not consistent with the refractive index of the polymer 71, and the emitted light passing through the light control members 40 can be refracted while passing through the boundary between the polymer 71 and the liquid crystal molecules 72. Therefore, the emitted light of the light emission angle reduced by the light control members 40 is allowed to be scattered. When there is voltage difference between the first electrode layer 61 and the second electrode layer 62, the liquid crystal molecules 72 are deflected by the effect of the electric field. At this time, the refractive index of the liquid crystal molecules 72 and the refractive index of the polymer 71 are consistent, and the emitted light passing through the light control members 40 is not refracted while passing through the boundary between the polymer 71 and the liquid crystal molecules 72. Therefore, the emitted light of the light emission angle reduced by the light control members 40 can still be emitted from the light conversion layer at a small angle to realize the anti-peep function.

The second base material layer 11 is disposed on a side of the second electrode layer 62 away from the viewing-angle transformation layer 70. A material of the second base material layer 11 can be same as the material of the first base material layer 10.

In this embodiment, by disposing the viewing-angle transformation layer 70 on the light control members 40, and by changing the voltage difference between the first electrode layer 61 and the second electrode layer 62, the deflection of the liquid crystal molecules 72 of the viewing-angle transformation layer 70 is controlled to realize turning on or turning off of the anti-peep function. When there is no voltage difference between the first electrode layer 61 and the second electrode layer 62, the anti-peep function is turned off, and the light is scattered after passing through the light control film. When there is the voltage difference between the first electrode layer 61 and the second electrode layer 62, the anti-peep function is turned on, and the light is still emitted at a small angle after passing through the light control film. For other descriptions, please refer to the embodiments mentioned above, and redundant description will not be mentioned herein again.

Figure 11:
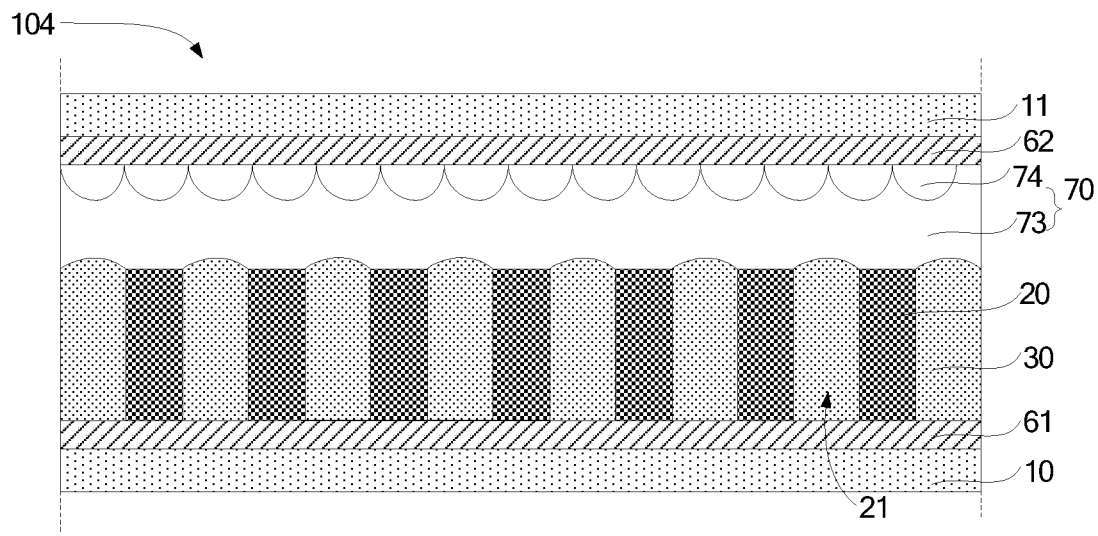
FIG. 11 is a schematic diagram of a fifth cross-sectional structure of the light control film provided by one embodiment of the present application.

In one embodiment, please refer to FIG. 11. FIG. 11 is a schematic diagram of a fifth cross-sectional structure of the light control film provided by one embodiment of the present application. The difference from the aforesaid embodiments is that the viewing-angle transformation layer 70 of the light control film 104 includes a cylindrical lens 74 and a liquid crystal layer 73 sequentially disposed on a side of the second electrode layer 62 away from the second base material layer 11, the liquid crystal layer 73 is disposed on an entire surface, and a refractive index of the cylindrical lens 74 and a refractive index of the liquid crystal layer 73 are different.

Specifically, the liquid crystal molecules in the liquid crystal layer 73 can be deflected under an electric field provided by the first electrode layer 61 and the second electrode layer 62, thereby changing the refractive index. When there is no voltage between the first electrode layer 61 and the second electrode layer 62, the refractive index of the liquid crystal layer 73 is not consistent with the refractive index of the cylindrical lens 74, and the emitted light passing through the light control members 40 can be refracted while passing through the boundary between the cylindrical lens 74 and the liquid crystal layer 73. Therefore, the emitted light of the light emission angle reduced by the light control members 40 is allowed to be scattered. When there is voltage difference between the first electrode layer 61 and the second electrode layer 62, liquid crystals of the liquid crystal layer 73 are deflected by the effect of the electric field. At this time, the refractive index of the liquid crystals of the liquid crystal layer 73 and the refractive index of the cylindrical lens 74 are consistent, and the emitted light passing through the light control members 40 is not refracted while passing through the boundary between the cylindrical lens 74 and the liquid crystal layer 73. Therefore, the emitted light of the light emission angle reduced by the light control members 40 can still be emitted from the light conversion layer at a small angle to realize the anti-peep function. For other descriptions, please refer to the embodiments mentioned above, and redundant description will not be mentioned herein again.

One embodiment of the present application further provides a display panel. The display panel includes the light control film of one of the aforesaid embodiments.

Figure 12:
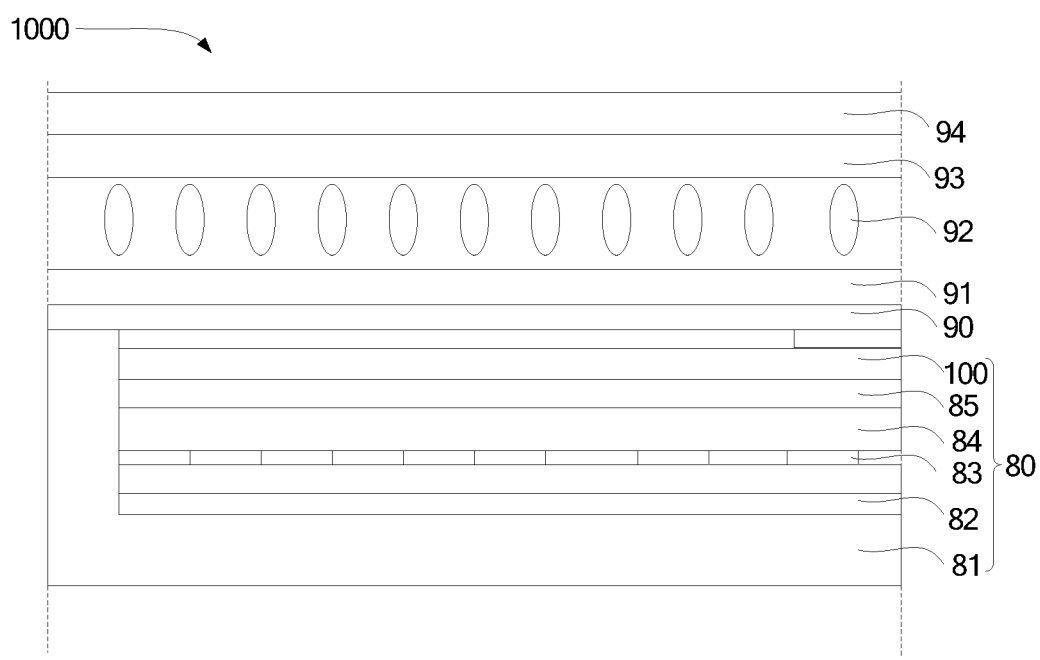
FIG. 12 is a schematic diagram of a cross-sectional structure of a display panel provided by one embodiment of the present application.

Specifically, please refer to FIG. 12. FIG. 12 is a schematic diagram of a cross-sectional structure of a display panel provided by one embodiment of the present application. The display panel 1000 is a liquid crystal display (LCD) panel. The display panel 1000 includes a backlight module 80, a lower polarizer sheet 90, an array substrate 91, a second liquid crystal layer 92, a color film substrate 93, and an upper polarizer sheet 94 from bottom to top.

A direct-lit backlight or an edge type backlight is adopted in the backlight module 80. In this embodiment, the backlight module 80 adopting the direct-lit backlight is taken as an example. The backlight module 80 includes a backplate 81, and a reflective sheet 82, a backlight source 83, a diffusion sheet 84, an optical film 85, and the light control film 100, etc., which are sequentially disposed in an accommodation space formed from the backplate 81.

After the light emitted by the backlight source 83 passes through the light control film 100, the light emission angle can be reduced, so that the light transmittance rate of the light control film 100 is improved. Meanwhile, the uniformity of the light brightness distribution within the visible range of the light control film 100 is also allowed to be improved, thereby increasing the brightness of the display panel 1000 and improving display quality of the display panel 1000.

Optionally, a light control film 100 can be not disposed in the backlight module 80, but is directly hung on the display panel 1000. Similarly, under a precondition of realizing the anti-peep function of the display panel 1000, the light transmittance rate of the light control film 100 can be improved, thereby increasing the brightness of the display panel 1000 and improving display quality of the display panel 1000.

One embodiment of the present application further provides a display device, which includes the display panel of one of the aforesaid embodiments, circuit boards and other devices bound on the display panel, and a cover plate covering the display panel, etc. The display device includes electronic equipment such as a mobile phone, a television, a wearable device, etc.

According to embodiments mentioned above:

The present application provides the light control film and the display panel. The light control film includes the first base material layer, the light blocking members, the light transmissive members, and the light control members. The light blocking members are disposed on the side of the first base material layer, and the light transmissive regions are defined between the light blocking members. The light transmissive members are filled in the light transmissive regions. The light control members are disposed on the light transmissive members, correspond to the light transmissive regions, and are configured to decrease light emission angles of light passing through the light transmissive members. Therefore, when certain light emission angles are realized, areas of the light transmissive regions are allowed to be enlarged, which improves a light transmittance rate of the light control film. Meanwhile, by disposing the viewing-angle transformation layer on the light control members, and by controlling the voltage difference between the first electrode layer and the second electrode layer, the viewing-angle transformation layer controls the light passing through the light transmissive members to realize switching between different viewing angles.

In the above embodiments, the description of each embodiment has its emphasis, and for some embodiments that may not be detailed, reference may be made to the relevant description of other embodiments.

The embodiments of present application are described in detail above. This article uses specific cases for describing the principles and the embodiments of the present application, and the description of the embodiments mentioned above is only for helping to understand the method and the core idea of the present application. It should be understood by those skilled in the art, that it can perform changes in the technical solution of the embodiments mentioned above, or can perform equivalent replacements in part of technical characteristics, and the changes or replacements do not make the essence of the corresponding technical solution depart from the scope of the technical solution of each embodiment of the present application.

What is claimed is:

1. A light control film, comprising:
a first base material layer;
light blocking members disposed on a side of the first base material layer, wherein light transmissive regions are defined between the light blocking members;
light transmissive members filled in the light transmissive regions;
light control members disposed on the light transmissive members, corresponding to the light transmissive regions, and configured to decrease light emission angles of light passing through the light transmissive members, and
wherein the light control film further comprises:
a first electrode layer disposed between the first base material layer and the light blocking members;
a viewing-angle transformation layer disposed on a side of the light blocking members and the light control members away from the first electrode layer;
a second electrode layer disposed on a side of the viewing-angle transformation layer away from the light control members; and
a second base material layer disposed on a side of the second electrode layer away from the viewing-angle transformation layer;
wherein the viewing-angle transformation layer is configured to allow light passing through the viewing-angle transformation layer to not be refracted, when a voltage difference exists between the first electrode layer and the second electrode layer; or the viewing-angle transformation layer is configured to allow the light passing through the viewing-angle transformation layer to be refracted, when the voltage difference does not exist between the first electrode layer and the second electrode layer.

2. The light control film as claimed in claim 1, wherein convex structures are disposed on a side of the light control members away from the first base material layer, and the convex structures form the light control members.

3. The light control film as claimed in claim 2, wherein a longitudinal cross- sectional shape of the convex structures is arc, coordinate points Rx and Rz on the arc satisfy an equation: $Rx=R*\sin(\theta)$, $Rz=R*\cos(\theta)$, wherein R indicates a distance between an emission point of the light and the coordinate points, and $\theta$ indicates an emission angle of the light in the light transmissive members.

4. The light control film as claimed in claim 1, wherein grooved structures are defined on a side of the light transmissive members away from the first base material layer, and the light control members are disposed in the grooved structures.

5. The light control film as claimed in claim 4, wherein a refractive index of the light control members is greater than a refractive index of the light transmissive members.

6. The light control film as claimed in claim 4, wherein a longitudinal cross-sectional shape of the light control members is elliptical.

7. The light control film as claimed in claim 1, wherein the light blocking member are disposed integrally, and openings are defined in the light blocking members to act as the light transmissive regions.

8. The light control film as claimed in claim 1, wherein the viewing-angle transformation layer comprises a polymer and liquid crystal molecules dispersed in the polymer, and a refractive index of the polymer and a refractive index of the liquid crystal molecules are different.

9. The light control film as claimed in claim 1, wherein the viewing-angle transformation layer comprises a cylindrical lens and a liquid crystal layer sequentially disposed on a side of the second electrode layer away from the second base material layer, and a refractive index of the cylindrical lens and a refractive index of the liquid crystal layer are different.

10. A display panel, comprising a light control film, wherein the light control film comprises:
a first base material layer;
light blocking members disposed on a side of the first base material layer, wherein light transmissive regions are defined between the light blocking members;
light transmissive members filled in the light transmissive regions;
light control members disposed on the light transmissive members, corresponding to the light transmissive regions, and are configured to decrease light emission angles of light passing through the light transmissive members, and
wherein the light control film further comprises:
a first electrode layer disposed between the first base material layer and the light blocking members;
a viewing-angle transformation layer disposed on a side of the light blocking members and the light control members away from the first electrode layer;
a second electrode layer disposed on a side of the viewing-angle transformation layer away from the light control members; and
a second base material layer disposed on a side of the second electrode layer away from the viewing-angle transformation layer;
wherein the viewing-angle transformation layer is configured to allow light passing through the viewing-angle transformation layer to not be refracted, when a voltage difference exists between the first electrode layer and the second electrode layer: or the viewing-angle transformation layer is configured to allow the light passing through the viewing-angle transformation layer to be refracted, when the voltage difference does not exist between the first electrode layer and the second electrode layer.

11. The display panel as claimed in claim 10, wherein convex structures are disposed on a side of the light control members away from the first base material layer, and the convex structures form the light control members.

12. The display panel as claimed in claim 11, wherein a longitudinal cross-sectional shape of the convex structures is arc, coordinate points Rx and Rz on the arc satisfy an equation: $Rx=R*\sin(\theta)$, $Rz=R*\cos(\theta)$, wherein R indicates a distance between an emission point of the light and the coordinate points, and $\theta$ indicates an emission angle of the light in the light transmissive members.

13. The display panel as claimed in claim 10, wherein grooved structures are defined on a side of the light transmissive members away from the first base material layer, and the light control members are disposed in the grooved structures.

14. The display panel as claimed in claim 13, wherein a refractive index of the light control members is greater than a refractive index of the light transmissive members.

15. The display panel as claimed in claim 13, wherein a longitudinal cross-sectional shape of the light control members is elliptical.

16. The display panel as claimed in claim 10, wherein the light blocking member are disposed integrally, and openings are defined in the light blocking members to act as the light transmissive regions.

17. The display panel as claimed in claim 10, wherein the viewing-angle transformation layer comprises a polymer and liquid crystal molecules dispersed in the polymer, and a refractive index of the polymer and a refractive index of the liquid crystal molecules are different.

18. The display panel as claimed in claim 10, wherein the viewing-angle transformation layer comprises a cylindrical lens and a liquid crystal layer sequentially disposed on a side of the second electrode layer away from the second base material layer, and a refractive index of the cylindrical lens and a refractive index of the liquid crystal layer are different.

\* \* \* \* \*